United States Patent [19]
Stenger

[11] 3,775,748
[45] Nov. 27, 1973

[54] SYSTEM AND DEVICE FOR THE EFFICIENT CONTROL AND DOCUMENTATION OF DATA IN COMPUTER INSTALLATIONS

[76] Inventor: Hanns G. Stenger, 70-11 34th Avenue, Jackson Heights, N.Y. 11372

[22] Filed: Feb. 24, 1971

[21] Appl. No.: 118,434

[52] U.S. Cl. .......................................... 340/152 R
[51] Int. Cl. .............................................. G08b 3/10
[58] Field of Search ................ 281/49 R; 248/58 R

[56] References Cited
UNITED STATES PATENTS

| | | | |
|---|---|---|---|
| 251,280 | 12/1881 | Peterson | 248/458 |
| 301,345 | 7/1884 | Dupin and Morris | 248/458 |
| 451,632 | 5/1891 | Burdick | 248/458 |
| 936,281 | 10/1909 | Woolsey | 248/458 |
| 1,531,330 | 3/1925 | Battle | 281/49 |
| 1,552,668 | 9/1925 | Battle | 281/49 |
| 1,632,783 | 6/1927 | Bird | 281/50 |
| 2,421,487 | 6/1947 | Dyck | 281/50 |
| 3,253,871 | 5/1966 | Karper | 281/50 |

*Primary Examiner*—Harold I. Pitts
*Attorney*—Howard E. Thompson, Jr. and Salvatore C. Mitri

[57] ABSTRACT

Efficient, effective and thorough control over and documentation of data received, utilized and completed in form for delivery in computer installations is provided by the system and device of the invention. Utilizing the system and device provided, a single, central controller is able to control and document such data from the moment it is received in the installation to the time it is picked up for delivery. The system provides for control of data so that any delays encountered in running a job can be brought immediately to the attention of the central controller who can then alter or re-schedule the times for running the jobs programmed for the computers. In addition, the central controller is provided with a device which enables him to immediately determine the status of any job being run or scheduled to be run.

4 Claims, 6 Drawing Figures

PATENTED NOV 27 1973 3,775,748

INVENTOR.
HANNS G. STENGER
BY
Howard L. Thompson Jr.
ATTORNEY

INVENTOR.
HANNS G. STENGER

ATTORNEY

SYSTEM AND DEVICE FOR THE EFFICIENT CONTROL AND DOCUMENTATION OF DATA IN COMPUTER INSTALLATIONS

This invention relates to a system and device for controlling and documenting data in computer data processing installations from the moment such data is received for processing until the time it is completed and in the form desired for delivery.

BACKGROUND OF THE INVENTION

At the inception of computerized data processing, the need for controlling and/or documenting the data to be processed was of little or no importance and, therefore, not believed to be necessary. This is not the case today. The rapid growth in the fields of computer technology and computer data processing have given rise to the use of what are referred to today as "third and fourth generation computers." These computers are capable of performing many different, independent jobs simultaneously or concurrently in very short periods of time and since they are expensive to operate and maintain, they are utilized to their fullest potential during every moment of operation which, today, is on a 24 hour basis. This requires proper programming of sufficient work loads as well as closely regulated time schedules for the various jobs the computer is programmed to handle.

In almost all instances, several of these "third and fourth generation computers" are installed in one location to comprise a computer installation so that the problems of control and documentation have increased algebraically while the number of such computers in use at any one installation has increased only arithmetically.

The rapid growth in sophisticated computer technology; that is, the "hardware" employed, coupled with the equally rapid growth in sophisticated computer data processing technology; that is, the "software" employed, and the increase in the number of computers employed in computer installations has far outpaced the meager training and development directed toward those persons who are responsible for controlling and operating such installations. As a result, most such computer installations have become overcrowded, hectic and chaotic areas in which to work. Computer operators are faced with daily tasks of locating important computer-related components such as tape units, disc units, run books, computer programs, identification labels, pre-punched identification cards, and the like, all of which are essential for the proper operation and full use of the computers under rigid time schedules. In addition, the proper control of the flow of data to and from the computers must be provided for. Under such conditions, however, input data is often omitted in a job run simply because it was not received at the proper computer at the right time, and it is not unusual for output data to be erroneous or incomplete simply because there was no way of checking it.

Attempts have been made in many computer installations to overcome and eliminate these problems by providing control clerks who are ostensibly responsible for controlling the flow of input and output data delivered to and received from the computer installations. However, these control clerks are asked to perform their duties utilizing techniques and systems that were efficient for their intended purposes for first generation computers, but which are hardly a match for third and fourth generation computer installations. Consequently, control clerks are today performing every function except that of control. They serve as messengers to deliver data in various forms to the different operating stations for which the data is scheduled to be run in the installation and attempt to log the delivery and receipt of such data on a log sheet which is often lost amid an array of miscellaneous cards, printed reports, time schedules, additional data forms, and the like, which clutter their desks. They act as telephone operators placing and receiving calls pertaining to the overall operational status of the installation as well as to the operational status of any one of a number of particular jobs. They must be aware of any delays pertaining to any segment of the operation so that job scheduling can be re-arranged and the proper persons notified, and must also complete and file a detailed account of all the work completed and/or in progress at the end of their work shifts.

In a field where time is computed in nanoseconds (billionths of a second), where delays can immobilize an entire computer installation and small errors are extremely expensive to correct, where the work load demand is overwhelming, and where the pace of activity is always hectic, it is imperative that proper and complete control over such operations be established and maintained. Given the proper tools, the control clerk can perform those functions vital to a smooth and efficient operation. However, as noted above, under present operating techniques and systems, the control clerk cannot even attempt to achieve his proper function, much less maintain it. As a result, control clerks often simply walk off their jobs in sheer frustration, thereby imposing one more expense on an already high cost operation.

THE INVENTION

It has now been found that the problems and difficulties described briefly above can be overcome by use of the system and device of this invention which provides for efficient data control, hereinafter referred to as "E.D.C.," of the data received and utilized in and then completed in form for delivery from a computer installation. The system and device of the invention make it possible for a single, central controller in a multicomputer installation to efficiently, effectively and thoroughly control and document the flow of data in whatever form such data is received or prepared from the time the data enters the installation to the time that the finished product is released for delivery.

The system is designed so that the central controller is immediately alterted to any delays which might affect the jobs being run in the installation at the moment such delays occur so that the various computer operators running those jobs can also be alerted. In turn, the computer operators can inform the central controller of any delays which they encounter in running a job. This is important since it not only provides an orderly means of keeping track of the status of each job, but also permits the central controller to provide for rearranging or altering the schedules of other jobs, thereby maintaining the computer units in constant use for maximum efficiency. Equally important is the fact that open and direct lines of immediate communication are established and maintained between the central controller and the computer operators at the various operating stations within the installation as well as with personnel in other departments associated with the installation.

Another advantage which the system of the invention gives rise to is that of providing management with useful data arranged on a format that permits management to readily and easily make time studies, be apprised of the nature and location of any problems encountered during any work shift, and provide them with tabulated data for billing purposes.

Since the central controller will receive, enter and check all data received from offline operations under the system of the invention, the turnover and proper identification of such data, such as tapes for the tape library, is readily provided through a single point.

These general advantages obtainable by the system of the invention, as well as others which are discussed hereinafter, include the use of two essential formats. One format is provided to identify the jobs scheduled to be run during a work shift in order by job category, each job being assigned a coded number which is preprinted on the format in ascending numerical order with the name of each job alongside its appropriate job number. Space is provided for each job thus listed and identified to note the times received in and/or sent from one operating station in the installation to another such as the library, key punch, offline, distribution, and the like, as well as note any important remarks pertaining to running of the job. The format is designed for use by as many as three work shifts during a 24 hour period and as many as twenty jobs can be listed on each format. Since this format provides information concerning the location and status of any job scheduled to be run during a work day, it can be seen that it effectively and efficiently controls and documents the flow of all incoming data, stored data, data being run, and outgoing data by a single person, the central controller, from a single point. Therefore, this format is designated as the input/output (I/O) data sheet.

On the other format used in the system of the invention, the same number of jobs scheduled to be run during a work shift are identified in the same manner as those on the I/O sheet, but are listed in sequence by job priority with the schedules for receipt and delivery to and from each operating station preprinted for each job. Space is also provided to note actual times of receipt and delivery to and from each station so that the actual times for running or handling the job at each station can be compared with the preprinted, scheduled times. In this way, delays or problems affecting any job at any station can be immediately reported to the central controller and noted and recorded by him so that corrective action can be taken, such as re-routing the next scheduled priority job. Provision is also made on the format to note any pertinent remarks and it, too, is designed for use by as many as three work shifts during a 24 hour work period, thereby closely paralleling the I/O sheet. Since this format lists the time schedules and priorities for each job, it is designated as the master scehdule (M/S) data sheet.

In order to realize the fullest potential of efficiency and thoroughness of the system of the invention, the central controller utilizes both the I/O and M/S sheets while only the M/S sheets are utilized by the operators at each work station of the computer installation. Hence, the computer operators at each station need only supply the information required on the M/S sheets for those jobs assigned to be completed or run by them and need not concern themselves with any other jobs which are not their responsibility. In effect, the M/S sheets alert the computer operators at each operating station when to expect to receive a job assigned to them, where the job is coming from, and to whom to send the job when they are finished with it. As a result, continuity is maintained when a job run bridges two or more work shifts.

Although the central controller is also provided with copies of the M/S sheets distributed to the computer operators, he need not fill in the actual receipt and delivery times of the jobs on this sheet, but can merely check off the appropriate spaces on the M/S sheet and fill in the times on the I/O sheet. This enables the central controller to determine the progress of each job on a single format so that he can promptly answer any inquiries relating to it and, since he has direct lines of communication with each station, it enables him to immediately check the status of any job at any station. When completed jobs are ready for delivery, the central controller can arrange for their pick up and when a job encounters difficulty at some station, he can arrange for re-scheduling of the job by reference to the priority list on the M/S sheet and enter the re-scheduled job on both his I/O sheet and the appropriate M/S sheet, thereafter notifying the appropriate operators at the stations affected so that they can correct their M/S sheets accordingly.

Under the system of the invention, every job to be run will enter and leave the installation through the central controller. Since the I/O sheet used by the central controller does not list the jobs in order of priority, his entries thereon will not always be in order of the jobs listed. Even though every job enters through the central controller, some jobs may require some other operations outside the installation which will not affect the central controller's entries on the I/O sheet. On the other hand, there may be instances where the central controller will have to total times or check the sums of times entered by an operator on his M/S sheet and also log the receipt and delivery of tapes, discs, prepunched cards and the like received from an offline station for delivery to a computer operator.

To further facilitate and simplify the use of the M/S and I/O sheets, these sheets can be color coded such as by tinting the formats a different color in each column designed for use by each station so that each station can be readily located on this sheet. Further, the entries made on these sheets by each work shift can also be of different color so that the shifts making such entries are readily identifiable.

Since most medium- and large-sized computer installations operate on a 24 hour basis each day of the week, it is important that the tape library maintain accurate and complete records of all tapes so that the turnover from one work shift to another can be made without errors, delays or discrepancies. Again, the central controller, properly filling in the I/O sheet, can check off the tapes accompanied with their appropriate identification labels which are received from the library for offline printing or punching and check these tapes again when they are received from the offline station for return to the library. Although the tapes pass through the central controller, the accompanying identification labels are normally returned by him to the library. If any discrepancies exist when the tapes are returned to the librarian, they can be readily rectified by the central controller since he has a complete record of all the appropriate identification labels. Thus, an accurate and thorough library turnover is assured at the end of each work shift.

These and other features of the system and device of the invention will become more apparent when considered together with the accompanying drawing wherein the several figures set forth various embodiments thereof by way of illustration and wherein.

Figure 1:
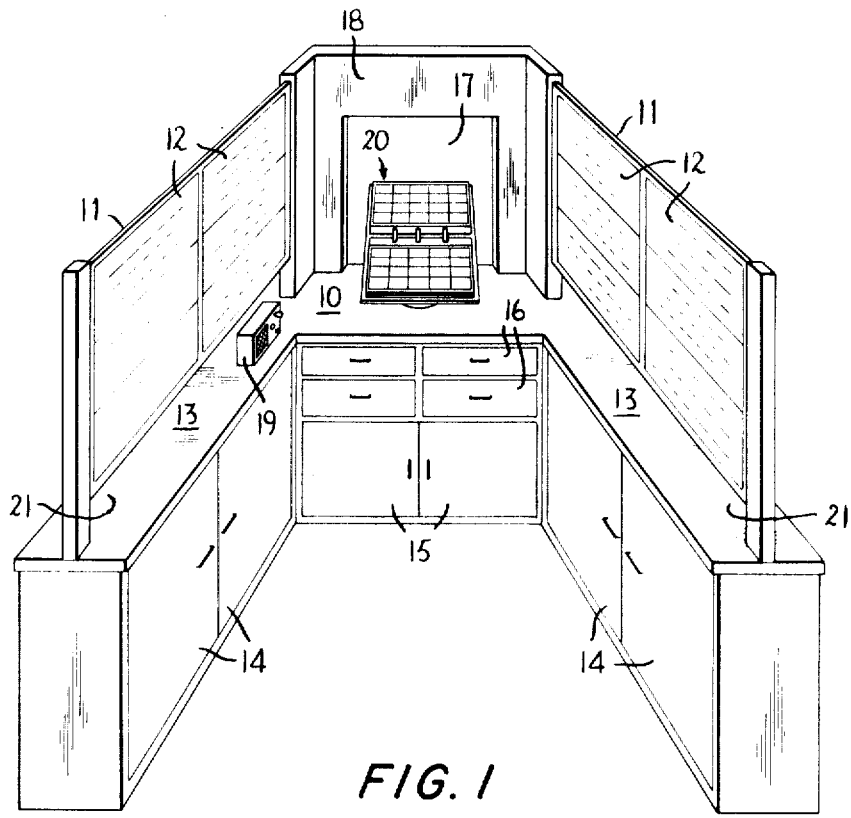
FIG. 1 is a perspective view of an EDC center located in an environment designed to yield maximum efficiency for the system of the invention and illustrating the use of the device of the invention therein.

As shown in FIG. 1, the EDC center comprises a central work surface 10 having panel means 11 arranged on either side of it for mounting thereon the M/S sheets 12 then in use by the computer operators at the various operating stations for ready reference and access by the central controller. Below the panel means 11 there can be provided shelves 13 which are preferably in the form of extensions of the work surface 10, and cabinets 14 for added work space and for storing M/S and I/O sheets. Additional cabinets 15 and drawers 16 can also be provided beneath work surface 10 for storing other miscellaneous items such as colored marking pencils, staplers, rubber bands, paper clips, note paper, and the like. The central work surface 10 can be made accessible to persons outside the EDC environment by providing an open window area as indicated at 17 and significant information such as dates, important telephone numbers, instructions, and the like can be posted in the window area 17 as at 18.

Preferably, the central controller is also provided with an intercom 19 in the EDC center which is connected to other intercoms at the various operating stations in the computer installation as well as desired departments outside the computer installation area so that the central controller can immediately communicate with any station to receive and relay important information and also communicate with personnel in other departments. The device of the invention, generally indicated at 20, can then be conveniently located at the central work surface 10 as shown in FIG. 1. It is also desirable that an open area be provided within the EDC center for direct, physical communication between the central controller and other personnel within the computer installation such as through the spaces indicated at 21 between panels 11 and shelves 13.

It can be seen, therefore, that by providing an EDC center as shown in FIG. 1, a single, central controller can effectively and efficiently control and document the flow of all data and materials relating to a plurality of jobs scheduled to be run at different stations in the computer installation in an environment that is orderly, neat and isolated from the normally hectic and chaotic atmosphere of such installations. By locating the EDC center in a strategic place, the central controller can also serve to prevent unauthorized personnel from entering the computer installation area, thereby acting as a security clearance.

As noted earlier, the I/O sheets used by the central controller are provided with an area to note when and by whom completed jobs are picked up for subsequent delivery. When these completed jobs are picked up for delivery, it is desirable to have the person picking up the job or jobs sign them out of the computer installation area. Since, in accordance with the invention, this is to be done on the I/O sheets, and since the central controller must have constant and immediate access to these I/O sheets, the device 20 of the invention has been provided to facilitate such operations.

Figure 2:
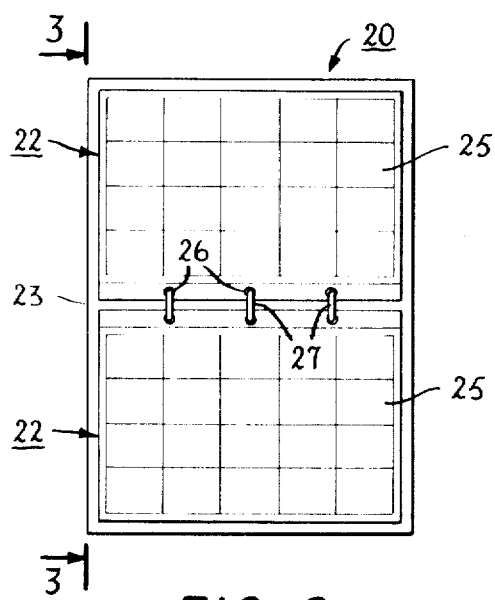
FIG. 2 is a plan view of one embodiment of the device of the invention showing a plurality of movable recording surfaces.
Figure 3:
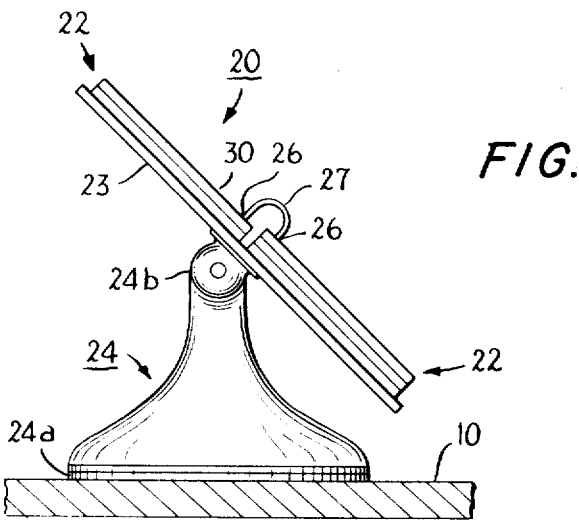
FIG. 3 is a side elevation view taken substantially on the line 3—3 of FIG. 2 indicating one type of adjustable mounting means.

As shown in FIGS. 2 and 3, device 20 comprises a plurality of rectangular, movable recording surfaces, generally shown at 22, which are mounted on a platform 23, which in turn, is secured to a conventional swivel or rotating base, generally shown at 24. (FIG. 3). The base 24 serves to facilitate displaying the I/O sheets either to the central controller or to one who is to sign an I/O sheet when picking up a completed job. The entire assemblage can be rotated on a vertical axis by movement of the base 24 with respect to its fixed base part 24a. The platform 23 can also be moved or turned about a horizontal axis formed at a pivot 24b of the base 24.

It will be apparent that the rotary and tilting movement of the platform 23 as above described will be effective for providing access to the recording surface 22 by persons outside the window 17 without movement of the base 24a with respect to the work surface 10, even with considerable variation in the positioning or orientation of the window 17 (FIG. 1). In some instances, however, it will be desirable to provide limited or guided movement of the base 24 with respect to work surface 10 in addition to, or in place of the movements above described for effectively exposing the recording surface 22 at a less conveniently located access window 17.

Each recording surface 22 is designed so that I/O forms 25 are exposed at both sides thereof and is also provided with a plurality of apertures 26 which are aligned to mate with conventional ring holders 27 mounted on platform 23. When secured in place by the ring holders 27, therefore, individual recording surfaces 22 can be turned similar to pages in a book to display the I/O forms 25 containing a particular job or plurality of jobs to be referred to by the central controller and/or the messengers picking up completed jobs for delivery.

Figure 4:
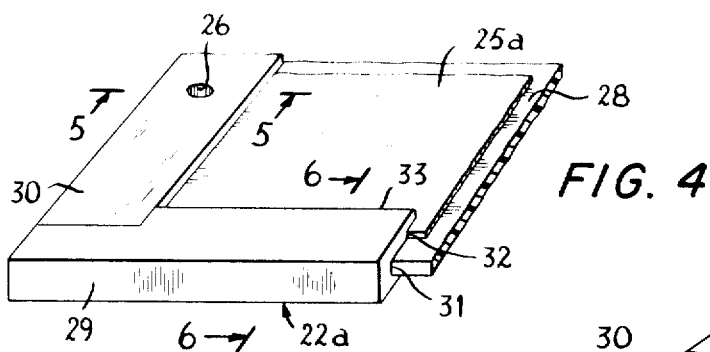
FIG. 4 is a fragmentary perspective view illustrating one means by which movable recording surfaces in accordance with the invention can be assembled.

While the double faced recording surfaces 22 can be provided in various ways, including, for example, double printing of the I/O forms 25 on opposed surfaces of light card stock material, it is preferable and more versatile to provide rigid frame and support members 22a interchangeably receiving forms 25 printed on lightweight paper sheets 25a which permits compact storeage for future reference. Details of one form of rigid frame and support member 22a are illustrated in FIGS. 4 to 6, wherein a thin rigid rectangular support member 28 is bounded on one, two or three sides by fixed frame members 29 and on at least one side by movable frame or locking members 30.

The frame members 29 have deep central channels 31 closely engaging edges of the member 28 and somewhat shallower and wider channels 32 forming inner flanges 33 which overlie edges of sheets 25a imprinted with the I/O forms.

Figure 5:
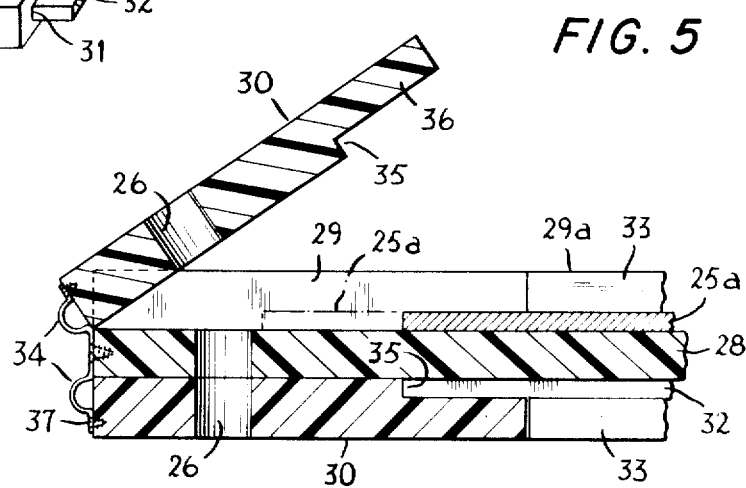
FIG. 5 is a fragmentary sectional view substantially on the line 5—5 of FIG. 4 with part of the structure in the open or extended position; and, FIG. 6 is a fragmentary sectional view substantially on the line 6—6 of FIG. 4.
Figure 6:
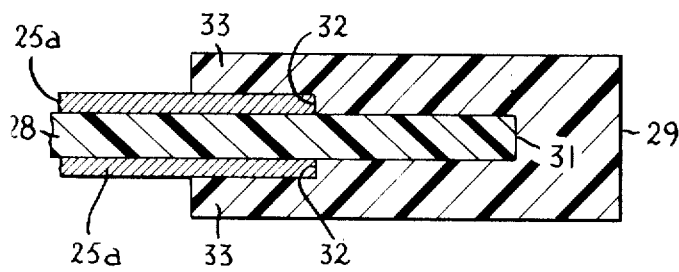

The movable frame or locking members 30 can be pivoted to each other and/or to the member 28, as seen at 34, to overlie the member 28 in a manner to interfit with an extension 29a of an associated frame part 29 formed by removal of a portion of the flange 33 thereof, as clearly shown in FIG. 5. Each of the members 30 is provided with an undercut 35 forming a flange 36 which will overlie a protruding edge of the sheet 25a which has been assembled with the other frame parts.

Spring means 37 (FIG. 5) may be provided to normally urge the frame parts 30 into engagement with the member 28 while permitting the frame parts 30 to be individually raised to facilitate insertion and removal of sheets 25a. It will be noted, in this connection, that in an assemblage in which three sides are bounded by frame parts 29 and only one side provided with movable frame parts 30, a flexible sheet 25a can readily be snapped into engagement with opposed side frame parts 29 while in the extended dotted line position shown in FIG. 5 and then slid to the full line position, i.e., a position in which the sheet 25a is under flange 33 at the opposed end of the assemblage; and when the raised frame member 30 drops into engagement with the member 28, the sheet 25a is fully supported against movement in the assemblage. When it is desired to remove a sheet 25a, the movable frame member 30 is lifted, the sheet 25a is slid to the dotted line position shown in FIG. 5, whereupon sliding of either side edge of the sheet 25a toward the center will disengage it from the flange 33 and permit complete removal from the assemblage.

In FIGS. 4 and 5 of the drawing, the frame parts 30 and associated portion of the member 28 have been provided with aligned apertures 26 for receiving ring holders 27 on the platform 23, as earlier described. While it is considered desirable to have the apertures 26 thus located to prevent tampering with the assemblage when mounted on the rings 27, it will be understood that the apertures 26 could also be provided in one of the frame parts 29, in which event opening movements of the frame parts 30 would be permitted while the assemblage was in engagement with the rings 27. Whether this arrangement or the tamperproof arrangement would be preferable would depend upon whether one was concerned primarily with security or primarily with quick and easy interchangeability of sheets 25a.

The platform and ring members 27 associated therewith should be of a size sufficient to accommodate about five recording surfaces 22 thereon. Since each recording surface 22 accommodates two I/O forms 25 and each I/O form 25 has provision for listing about twenty different jobs thereon, device 20 can provide for control and documentation of about 200 different jobs at a single location by an individual controller.

With the operation of computer centers being conducted on an essentially round-the-clock basis, it will be apparent that the group of recording surfaces 22 or frame and support members 22a mounted on the device 20 will be constantly changing as groups of jobs are completed and newly scheduled jobs are being added. The durability and flexibility which is provided, particularly when using the rigid frame and support members 22a with paper sheets 25a bearing the I/O forms 25, is of special significance when considering the preliminary handling by associate personnel in setting up the I/O forms for a series of jobs, the repeated handling by the controller in making entries from time to time with respect to jobs in progress, and the further handling by the other associate personnel after jobs have been completed and before the I/O forms are ready to be placed in storeage. While paper sheets 25a can be quickly and easily inserted into and removed from the rigid support and frame member 22a, these sheets are firmly supported to permit neat and accurate entries and at the same time protected against physical damage which would be experienced with unprotected paper sheets. As earlier mentioned, suitable durability in use could be provided by printing the forms 25 on opposed sides of heavier card stock material, and while this might permit a lower initial cost in installing the new control system, this advantage could be offset by the added storeage expense, particularly if there was a need for keeping completed I/O forms for extended periods of time.

The types of materials used to manufacture the various components of the device 20 are not critical, but it is preferred that the components comprising the rigid frame and support members 22a be produced from moldable plastics so that they will be durable and yet lightweight and inexpensive.

Although the system and device of the invention have been described in some detail and with particularity, it should be understood that changes, modifications and alterations can be made therein without departing from the scope and spirit of the invention.

What is claimed:

1. An efficient data control center for an integrated computer installation having a plurality of computer operating stations, said control center adapted to be manned by an individual as a "central controller" and comprising a central work surface; a cumulative recording device movably mounted on said central work surface, said device providing relatively movable recording surfaces for entry of jobs chronologically by job number and entry of notations relating to input and output data pertaining to a plurality of different jobs in said installation, said movable recording surfaces being supported against a planar surface which is tiltable to an angle of at least 45° to the horizontal, the movable mounting of said cumulative recording device providing movement of said recording surfaces from a position of easy access by said central controller to a position of easy access by individuals outside said environment; extensions of said work surface disposed angularly at both sides thereof providing an easily accessible environment within which said central controller is situated; panel means above and in alignment with said angularly disposed work surface extensions providing readily visible support means for a plurality of master schedule data sheets for entry of jobs chronologically in order of their time priorities, said master schedule sheets being duplicates of those maintained at said computer operating stations, said panel means being vertically spaced from said work surface extensions to form openings therebetween facilitating physical communication between said central controller within said environment and other computer personnel outside said environment, and means within said environment providing two way audio communication between said central controller and each of said operating stations, such that said central controller is constantly advised of information relating to the jobs entered on said movable recording surfaces and said master schedule sheets.

2. A data control center as defined in claim 1 wherein said relatively movable recording surfaces comprise rigid planar members with recording forms at opposed surfaces thereof, said planar members being arranged in adjacent stacks in engagement with ring means facilitating a pivotal transfer, in loose-leaf book fashion, of said rigid planar emmbers from one stack to the other, each of said rigid planar members comprising a frame, a thin support member interfitting with said frame, and locking means forming at least one side of said frame, said frame and said locking member having inwardly extending flanges closely spaced from both surfaces of said support member forming peripheral channels for receiving edges of thin sheets providing said recording surfaces at opposed sides of said support member.

3. A data control center as defined in claim 2 wherein said locking means comprises two members hingeably secured to one end of said support member for pivotal movement from positions of engagement with the surfaces of said support member to outwardly extending positions which provide access to the peripheral channels of said frame member.

4. A data control center as defined in claim 3 wherein said last named end of the support member and said hinged members are provided with aligned apertures for receiving said ring means, and engagement of said ring means with said aligned apertures provides means for normally supporting the hinged members of said locking means in engagement with the surfaces of said support member.

* * * * *